(12) United States Patent
Soldavini

(10) Patent No.: US 6,253,904 B1
(45) Date of Patent: Jul. 3, 2001

(54) METHODS AND APPARATUS FOR THE AUTOMATIC LOADING OF MULTIPLE ITEMS ON THE SAME UNIT OF A CROSS-BELT SORTING MACHINE

(75) Inventor: Attilio Soldavini, Ferno-VA (IT)

(73) Assignee: CML Handling Technology S.p.A., Pozzolo (IT)

( * ) Notice: Subject to any disclaimer, the term of this patent is extended or adjusted under 35 U.S.C. 154(b) by 0 days.

(21) Appl. No.: 09/332,533

(22) Filed: Jun. 14, 1999

(30) Foreign Application Priority Data

Jun. 12, 1998 (IT) ............................................... MI98A1342

(51) Int. Cl.[7] ........................... B65G 47/26; B65G 47/31
(52) U.S. Cl. ........................... 198/431; 198/357; 198/434
(58) Field of Search ................................. 198/357, 374, 198/434, 431

(56) References Cited

U.S. PATENT DOCUMENTS

| | | | |
|---|---|---|---|
| 3,106,280 | * 10/1963 | Baker | 198/431 |
| 3,247,981 | * 4/1966 | Johnson | 198/374 X |
| 4,519,493 | 5/1985 | Dyer . | |
| 4,915,209 | * 4/1990 | Canziani | 198/357 |
| 4,923,067 | * 5/1990 | Fuller, Jr. et al. | 209/539 |
| 5,048,695 | * 9/1991 | Fuller, Jr. et al. | 209/552 |
| 5,088,912 | * 2/1992 | Raque et al. | 198/431 X |
| 5,367,466 | 11/1994 | Canziani . | |

FOREIGN PATENT DOCUMENTS

| | | |
|---|---|---|
| 1 296 093 | 5/1969 | (DE) . |
| 0 518 180 | 12/1992 | (EP) . |
| 0 519 339 | 12/1992 | (EP) . |
| 0 556 866 | 8/1993 | (EP) . |
| 2 562 519 | 10/1985 | (FR) . |
| 1 395 490 | 5/1975 | (GB) . |

* cited by examiner

*Primary Examiner*—Steven A. Bratlie
(74) *Attorney, Agent, or Firm*—Burns, Doane, Swecker & Mathis, L.L.P.

(57) ABSTRACT

A loading station for the automatic loading of multiple items on the same unit of a sorting machine. The loading station includes several feeding belts capable of receiving and transferring the items to a loading belt capable of receiving such items and feeding them to the sorting machine. The feeding belts include at least one belt mounted on a support capable of rotating 180° about a vertical axis to reverse the order of items being conveyed on the belt. A transfer conveyor transfers the items to the loading belt. The transfer conveyor includes a frame carrying a drivable belt. The frame is extensible and retractable relative to an upstream feeding conveyor. Items are deposited onto the drivable belt as the belt is non-driven and the frame is being extended. Then, the frame is retracted while driving the belt forwardly at the same speed that the frame is retracted. The items thus have no net speed and eventually fall onto the loading belt while the latter is stationary, whereby the orientation of the items on the drivable belt is maintained on the loading belt.

14 Claims, 3 Drawing Sheets

METHODS AND APPARATUS FOR THE AUTOMATIC LOADING OF MULTIPLE ITEMS ON THE SAME UNIT OF A CROSS-BELT SORTING MACHINE

BACKGROUNDS OF THE INVENTION

The invention relates to the unloading of the items, especially in pairs, on a sorting machine of the so-called "cross belt" type.

Such a machine, described for example in commonly owned European Patents EP-0 481 341, EP 0 518 180 and EP 0 556 866, arranges items on units constituted by trolleys capable of traveling along a path. Each trolley is fitted with a small rotating mat or belt which unloads the items to the side of the machine, whenever the unit reaches certain collecting systems assigned to each item.

In the machine described in the above patents the belts are of adequate length to accept at least two items set side-by-side, thus allowing, thanks to an appropriate handling process, to double the productivity of the existing machines.

In particular, this result is achieved by pre-positioning the two items arranged on the belt of the switching unit so as to allow their conveyance to their respective destinations by two successive starts of the belt.

To ensure a proper handling of this equipment it is therefore essential to load the items in pairs in a precise order consistent with the unloading order, and to achieve this without adversely affecting the loading time and without requiring complex procedures or some preliminary handling of the items.

It is also appropriate and essential that the items be loaded onto the machine closely parallel to the edges of the small mat of the sorting unit, so as to achieve a greater precision at the time of unloading.

It is in fact worth considering that these machines move forward at speeds of a few meters per second, and that in any machines fitted with numerous outlets, the latter are of a size hardly larger than that of the items to be sorted.

It is therefore necessary that the unloading operation, of a ballistic type, also occur with the utmost precision.

The most advanced existing machines comprise a series of loading stations constituted by a succession of rotating mats designed to load the items on the trolleys.

In particular, sorting machines are known in which the loading station mats are arranged at a 45° angle with respect to the machine within a horizontal plane, so that the loading of the items can be carried out at a speed involving a component, in the direction of the forward motion of the trolleys, equal to the speed of the latter.

It is then possible, by appropriately starting the trolley mat at the loading instant, to feed the item onto the machine at an essentially zero relative speed in the direction of the forward motion, except for some later dampening of the push imparted to the item, by suitably slowing down the mat.

All this can provide an idea of the complexity of the handling systems of these machines.

It would be desirable to provide for the automatic loading of multiple items onto a unit of a cross-belt sorting machine, in a manner which allows the items to be arranged in the order of their unloading and to be fed onto the machine while observing the proper relative positioning and the expected alignment.

SUMMARY OF THE INVENTION

This invention proposes a method and equipment unit that allows the automatic loading of multiple items on the same unit of a cross-belt sorting machine, by arranging the items in the order of their subsequent unloading. The disclosed preferred method according to the invention provides steps for:

arranging the items on a first conveyor belt, while aligning them with a fixed reference;

transferring the items to a second belt moving at a different speed from the former, so as to arrange them at a pre-established distance, also based on the size of the items;

checking the order in which these items are to be unloaded, and transferring them to a conveyor belt mounted on a support capable of rotating 180°, so as to reverse the order of the items, if necessary; and transferring these items to a feeding belt which loads them onto the machine at the proper moment.

The invention also relates to the related apparatus, which comprises: two or more belts arranged in series, operable so as to rotate at different speeds;

a belt mounted on a support capable of rotating 180° around a substantially vertical axis;

a belt lined up with the previous belts, mounted on a sliding support capable of moving said belt from a position in which it is fully withdrawn from beneath an upstream belt to another position in which it is moved forward to receive and unload the items;

a feeding belt inclined at a 45° angle with respect to the previous belts, capable of unloading the items onto a sorting machine moving forward in a crosswise direction with respect to the former belts.

BRIEF DESCRIPTION OF THE DRAWINGS

This invention will now be described in detail, for exemplifying and non-limiting purposes, with reference to the drawings. in which.

DETAILED DESCRIPTION OF A PREFERRED EMBODIMENT OF THE INVENTION

Figure 1:
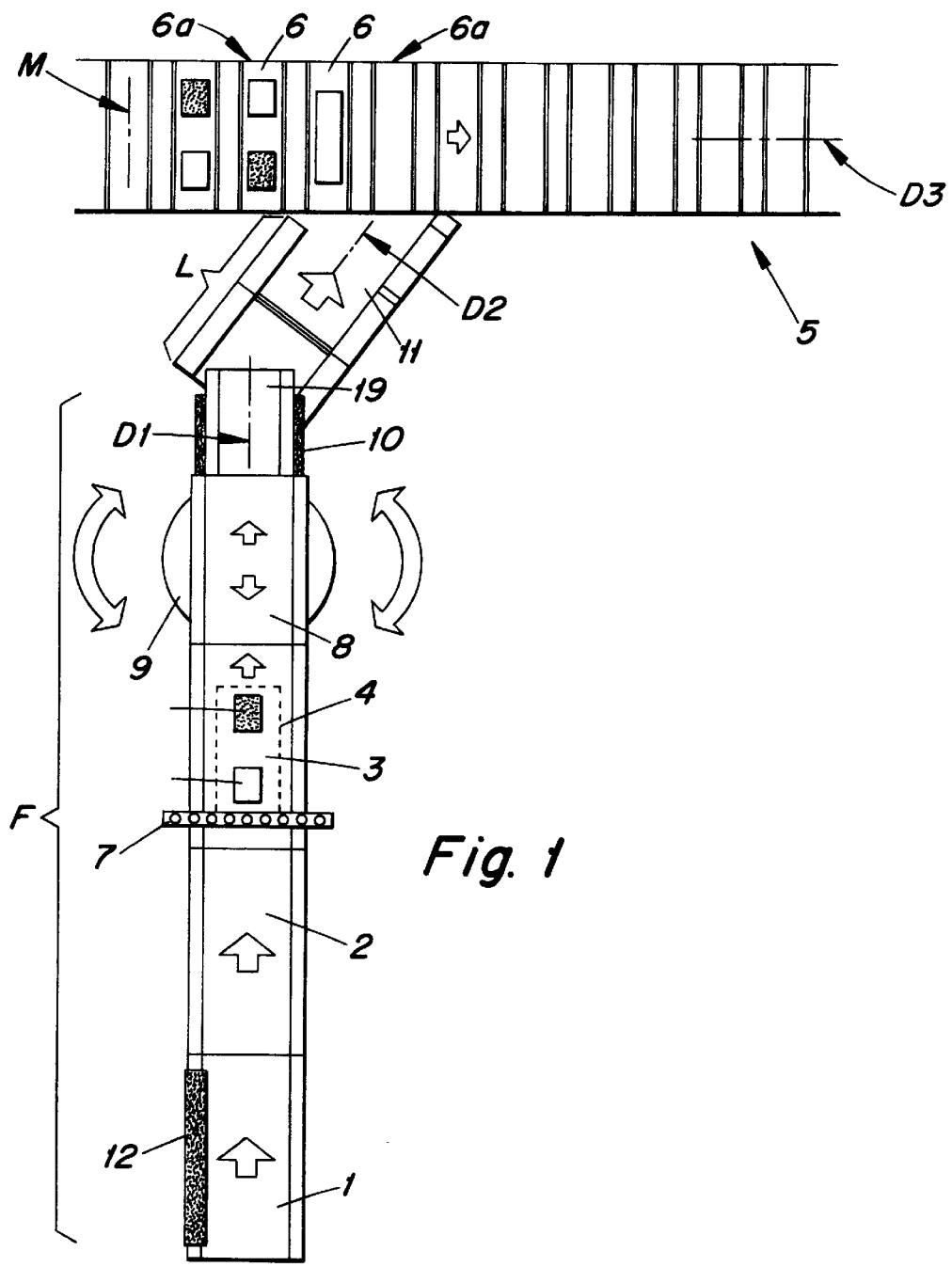
FIG. 1 is a simplified ground view of a loading equipment unit according to the invention.

With reference to FIG. 1, the loading station comprises a feeding section F and a loading section L. The feeding section F includes a first conveyor belt 1, on which an operator deposits items in succession, by placing them against a fixed reference wall 12, constituted for example by an edge of the same belt. A second belt 2 is arranged downstream of the belt 1, which is similar to the belt 1 and can be moved at a different speed, in particular to move forward at a greater speed, than that of belt 1.

The combination of the belts 1 and 2 is then used to extract the individual items from the succession of items, and to regulate their linear distance so that the two objects can be transferred to a downstream belt 3 arranged in such a manner as to occupy a space 4 on the belt 3, essentially corresponding to the space that the machine makes available to both items on the respective sorting unit 6a of the switching machine 5.

Each of the individual units 6a is composed of a trolley fitted with a small rotatable mat or belt 6 designed to accept the items.

The pair of items I on belt 3 is checked by a scanner or bar-code scanner 7, which informs the machine's central control unit of the items' respective final destinations.

A reversing conveyor belt 8, arranged downstream of the belt 3, is mounted on a support 9 which can be commanded to rotate 180° around a substantially vertical axis, so as to reverse the order of the items carried onboard the belt 8.

A transfer conveyor belt 19 is provided for transferring items from the feeding section F to a loading belt 11 of the loading section L. The belt 19 is arranged downstream of the reversing belt 8, and is mounted on a sliding frame 10 for movement between two positions.

Figure 6:
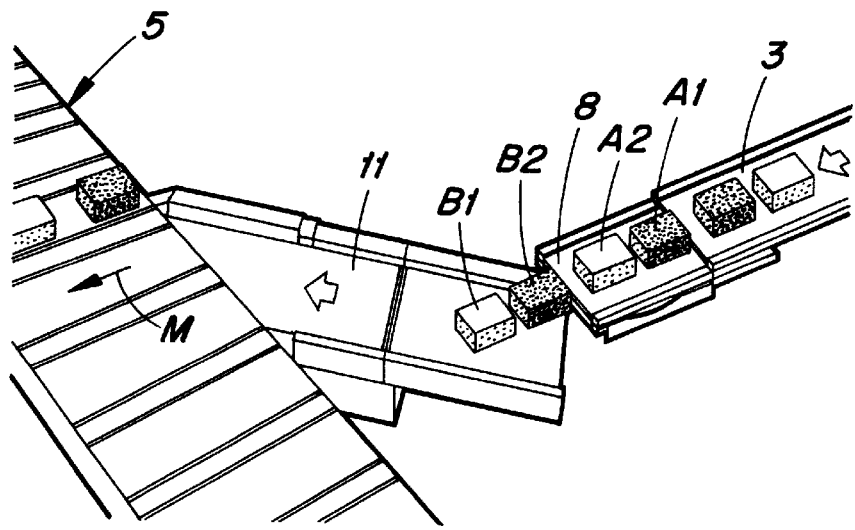
Figure 7:
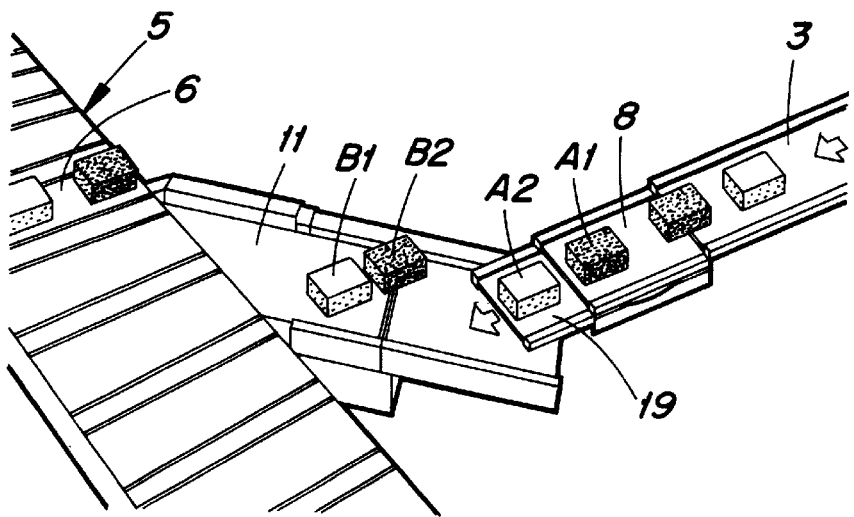

In one of these positions the belt 19 is fully retracted beneath the belt 8 (e.g., see FIG. 6), in contrast to being fully extended forwardly in the other position so as to end up above the loading belt 11, which handles the feeding of the items to the sorting machine (see FIG. 7).

The sorting machine 5 moves in an essentially crosswise direction with respect to the belts 1, 2, 3, 8 and 19, while the belt 11 is arranged at a 45° angle with respect to the other belts and to the sorting machine (see FIG. 1).

Based on the method according to the invention, the equipment described above operates as follows:

The operator arranges the items on the feeding belt 1, while lining them up against the reference wall 12.

The belt 1 directs the items to the belt 2, which is induced to rotate at a greater speed than the former, so as to space out the items.

From the belt 2 the items pass over to the next belt 3, where the scanner 7 checks the destination of each item.

During this phase the belt 3 moves forward at the same speed as the belt 2, so as to keep the same distance between the two items.

On the belt 3 the items keep a distance such as to occupy a position disposed within the space 4 corresponding essentially to the space that the machine makes available to the two items on the sorting unit assigned to them.

The relative positioning of the two items can occur by simply acting on the speed of the two adjacent belts 1, 2, or if necessary also by checking the passing and the size of the items by using the same scanner 7 and consequently varying, thanks to the software, the speed of the belt 3, so as to load the following item in the appropriate position.

Once the destinations of the two items are known, two situations may arise. In the simplest case, the arrangement of the two items already reflects the desired position for loading onto the machine, so that no reversing of the loading order is needed. In another case, the arrangement of the items differs from the expected type, so that the order must be reversed.

In the latter case, after the items have been transferred from the belt 3 to the belt 8, the support 9 is rotated 180°, so that the items are arranged in a reversed order with respect to the previous order.

The passing of the items from the belt 3 to the belt 8 occurs while the belts move at the same speed, so as to maintain the same spacing between the items.

From the belt 8 the items must be transferred to the inclined belt 11, which takes care of feeding them to the machine.

In order to prevent the items from rotating or losing the necessary alignment while passing to the belt 11, it is appropriate to have this transfer occur at a relative speed of essentially zero between the items and the receiving belt.

For this reason and for transferring the items from belt 8 to belt 11, the intermediate transferring belt 19 is provided, which may be a telescopic belt or, as in the case shown in the figure, a small rotating belt 19 mounted on a frame 10 that is capable of sliding forward in a direction parallel to a direction of conveyance D1 defined by the belt 19.

The driving unit governing the forward and return motion of the frame 10 may be adjusted in such a manner that the forward speed of the frame 10 matches the sliding speed of the belts 8 and 19.

This makes it possible to advance (extend) the frame 10 and then drive the belt 19 forward at the same speed as the belt 8 while transferring the items (or to keep the belt 19 still (non-driven) and advance the frame 10 together with the belt 19, while transferring the items to the belt 19 from the belt 8).

Once all the items have been transferred to the belt 19, they can be transferred to the belt 11 while the belt 11 is idle (non-driven).

For this purpose the belt 19 is driven forwardly while simultaneously retracting the frame 10 at a speed equal to the forward speed of the belt 19.

Figure 2:
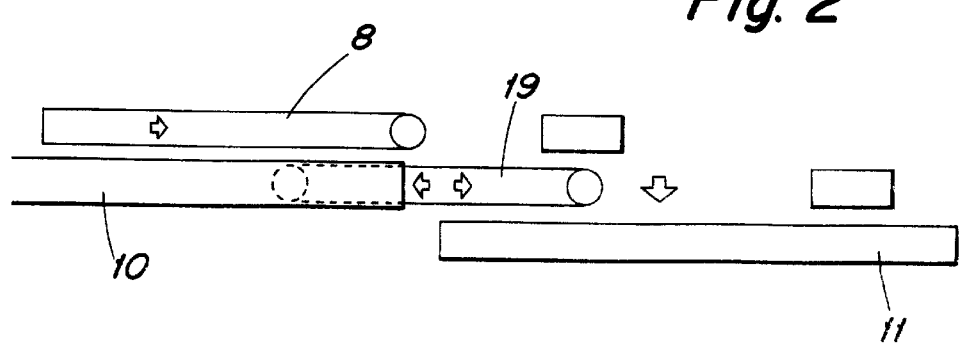
FIG. 2 is a simplified partial view of the equipment unit shown in FIG. 1.

This results, as shown in FIG. 2, in the items having a zero net speed in a direction of conveyance (travel) D1 defined by the belt 19. Eventually, all the items fall onto the stationary belt 11 at an essentially zero speed in direction D1, while maintaining, even in this passing action, both their relative spacing and proper alignment.

At this point the loading belt 11 holds a pair of items already arranged in the proper direction and at the right spacing, ready to be loaded onto the machine in accordance with the known technologies.

The succession of the loading phases is better illustrated in the prospective views offered in FIGS. 3 to 6.

Figure 3:
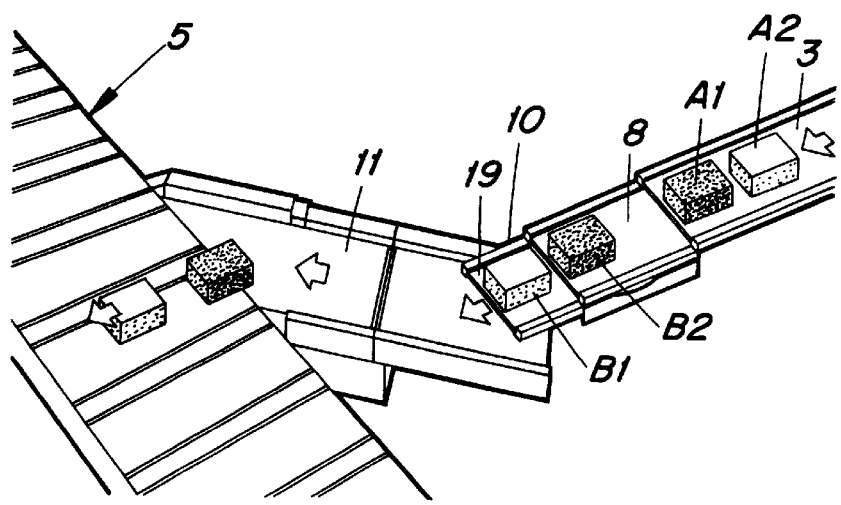
FIGS. 3 to 7 are simplified prospective views of a loading station according to the invention, during the various phases of the feeding process of the items to the machine.

In the situation of FIG. 3, a pair of packages A1, A2 are arranged on the belt 3, ready to be transferred to the rotating belt 8.

At the same time, packages B1, B2 are being transferred from the belt 8 to the belt 19 in the following manner.

The belt 19 is being extended (i.e., the belt support 10 is caused to slide forward), while holding the belt 19 against rotation;

The rotation of the belt 8 (which may be considered to constitute a feeding conveyor) is started so as to move forward at the same speed as the extension speed of the frame 10, while transferring the packages B1, B2 to the belt 19.

Figure 4:
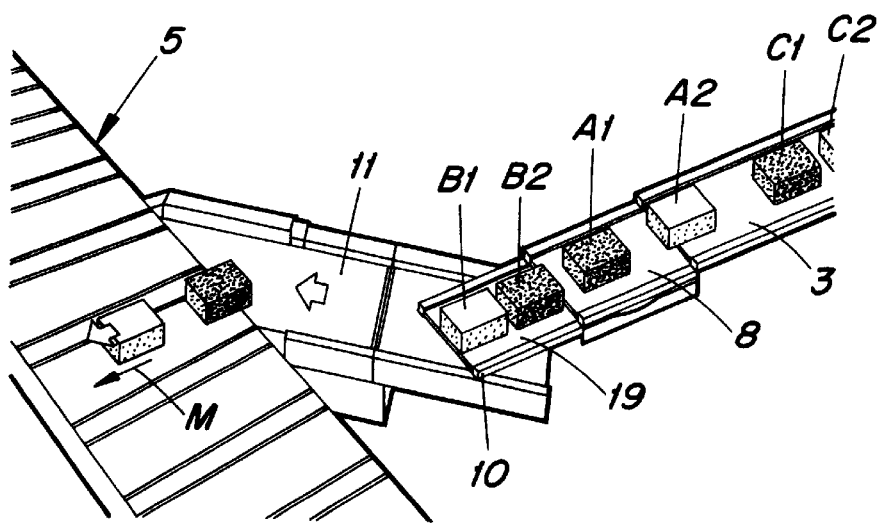

In the meantime, the packages A1, A2 are transferred from belt 3 to belt 8. At this point the situation is as shown in FIG. 4, where the frame 10 is fully extended and the two packages B1, B2 have been transferred to the same, while belt 8 holds the package A1 and is about to receive the package A2 from the belt 3.

During the third phase (FIG. 5) the frame 10 starts to "withdraw", i.e., to be retracted, while now driving the belt 19 forwardly at the same speed as the retracting speed of the frame 10, so that the speed of the packages B1, B2 is zero in the direction D1.

The packages B1, B2 are thus deposited onto the non-driven belt 11, i.e., onto the center line of the direction of conveyance D2 of the belt 11, without sliding or becoming disoriented as could have occurred if the packages had possessed a velocity in the direction D1. That is, the packages B1, B2 are still aligned in a direction parallel to the direction D1 and the direction of movement M of the belts 6 (see FIGS. 1 and 6).

Figure 5:
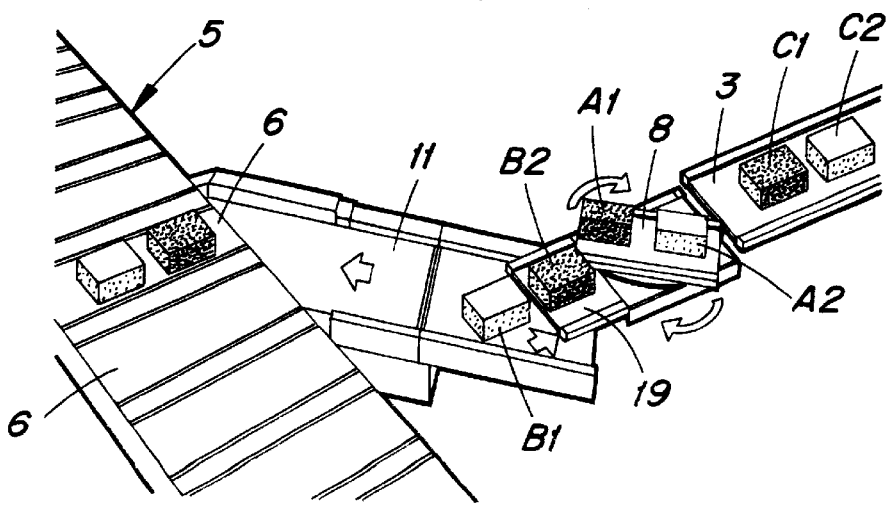

If necessary, the conveyor 8 could be rotated about a vertical axis by 180° to reverse the two packages A1, A2 into the proper loading sequence (see FIG. 5).

The belt 11 is then driven, whereby the packages B1, B2 now present on the belt 11 are moved toward the sorting machine 5 (FIGS. 6 and 7), while the frame 10 resumes its forward motion (FIG. 7) to receive the packages A2, A1 from the belt 8. In the meantime, two subsequent packages C1, C2 coming from the belt 3 are about to be transferred to belt 8.

Based on the configuration and the method described, it is therefore not only possible to achieve the arrangement of the pairs of items to be loaded onto the machine, but also their motion so as to position them in the proper direction and to maintain the same during all their transfers.

Moreover, the rotational phase of the items to reverse their loading order may, if necessary, occur simultaneously with, and relative to, the forward motion of the packages which are already arranged and to the packages which follow, thus exploiting what could have otherwise been a dead moment in the operation of the equipment, without affecting the overall productivity of the machine.

An expert in the art may provide for several modifications and variations, all of which could nevertheless be deemed to fall within the scope of this invention as defined by the appended claims.

For instance, the same equipment may also be utilized for loading items on a sorting machine, by arranging them in a pre-established direction.

The known technologies, as shown in the description relating to the state of the technology, are in fact capable of allowing a precise positioning of the items, but make it difficult to orient them. Whereas it is in fact easy to orient the items parallel to the direction D2 of the feeding belt 11, it is more complex to orient them at an angle of 45° with respect to the direction D2, so that, at the end of all the motions needed for their feeding to the machine, the items loaded on the sorting machine will find themselves aligned parallel to the direction M of the belts 16.

This purpose can be served by the equipment according to this invention, which may, for this specific application, omit the belt 8. As in the former case, the operator would load the items on the belt 1 by lining them up with the fixed reference 12, and transferring the items in succession to the small belts 2 and 3. The belt 3 unloads the items directly onto the intermediate belt 19 which deposits them, as described above, on the loading belt 11 at an essentially zero speed in direction D1, while the loading belt 11 is not rotating, thus avoiding any risk that the items may suffer motions, rotations or the like as could otherwise result from impacting with a moving belt.

At this point the items find themselves on the loading belt in the required position and at the optimum orientation for their subsequent loading phase.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A sorting apparatus comprising a sorting mechanism including a plurality of sorting units movable in a first direction of travel for conveying items to respective destinations, each sorting unit including a sorting conveyor for moving items transversely of the first direction of travel, and a loading station for loading multiple items onto each of the sorting conveyors, the loading station comprising:

a sensing mechanism for sensing destination information regarding each item to establish an order in which multiple items are to be loaded onto a sorting conveyor;

a loading section including a loading conveyor for advancing items to the sorting units in a second direction of travel forming an oblique angle with the first direction of travel, and a feeding section for delivering items to the loading section, the feeding section including:

a reversing mechanism including a reversing conveyor drivable for advancing items between opposite ends of the reversing conveyor, and a support carrying the reversing conveyor and being displaceable for reversing the opposite ends of the reversing conveyor to reverse the order of multiple items conveyed on the reversing conveyor, to conform the order of the items to an order established by the sensing mechanism, and a transfer conveyor disposed downstream of the reversing conveyor for transferring the multiple items to the loading section, the transfer conveyor defining a third direction of travel oriented non-parallel to the second direction of travel, the transfer conveyor arranged to transfer each item to the loading section with a substantially zero velocity along the third direction of travel.

2. The sorting apparatus according to claim 1 wherein the transfer conveyor is disposed above the loading section and including a support frame and a movable conveying surface mounted on the support frame for conveying items in the third direction, the support frame being extendable in the third direction from beneath the reversing conveyor with the conveying surface being non-driven, for receiving items from the reversing conveyor; the support frame being retractable in a direction opposite the third direction with the conveying surface driven to convey the received items in the third direction at the same sped that the frame is retracted, whereby the items have no net speed in the third direction and eventually fall from the transfer conveyor and onto the loading section.

3. The sorting apparatus according to claim 2 wherein the conveying surface of the transfer conveyor is defined by an endless belt.

4. The sorting apparatus according to claim 2 wherein the first and third directions of conveyance are substantially parallel to one another.

5. The sorting apparatus according to claim 2 wherein the support of the reversing mechanism is rotatable about a substantially vertical axis.

6. The sorting apparatus according to claim 1 wherein the support of the reversing mechanism is rotatable about a substantially vertical axis.

7. The sorting apparatus according to claim 1 wherein the feeding section further comprises upstream and downstream conveyors arranged immediately adjacent one another at a location upstream of the reversing conveyor, the downstream conveyor driven at a different speed than the upstream conveyor for changing a spacing between successive items.

8. The sorting apparatus according to claim 1 further including determining means for determining item destinations and for controlling the reversing conveyor.

9. The sorting apparatus according to claim 8 wherein the determining means includes a scanner for reading indicia on the items as the items travel along the feeding section.

10. A loading station for loading items onto a sorting unit movable in a first direction of travel at the loading station, the loading station comprising:

a feeding section for feeding items and including an orienting structure for orienting the items in a second direction of travel oriented perpendicularly to the first direction of travel, the feeding section further including a transfer conveyor and a feeding conveyor disposed upstream of the transfer conveyor, the transfer conveyor comprising a drivable endless belt mounted on a frame that is slidable along the second direction of travel relative to the feeding conveyor, wherein the transfer conveyor is operable to discharge each item with a substantially zero velocity along the second direction of travel; and a loading conveyor having an inlet and disposed beneath the transfer conveyor for receiving items discharged from the transfer conveyor and loading the items onto the sorting unit;

the loading conveyor defining a third direction of conveyance extending at 45° relative to each of the first and second directions of travel as the loading station is viewed from above.

11. The loading station according to claim 10 further including means for retracting the frame opposite the second direction of travel at the same speed that the belt conveys the items in the second direction of travel, wherein the items are transferred from the transfer conveyor to the loading conveyor at zero speed along the second direction of travel.

12. A method for loading multiple items onto a mobile sorting unit of an item-sorting mechanism, comprising the steps of:

A) determining destinations of the items, for establishing an order of loading of the items onto the sorting unit;

B) conveying the items along a feeding section;

C) actuating a reversing mechanism for reversing the order of multiple items conveyed in step B if the order thereof does not conform to the order of loading;

D) subsequent to step C conveying the items onto a transfer conveyor defining a direction of conveyance disposed above a loading section arranged to load the items onto the sorting unit; and E) actuating the transfer conveyor for transferring the items onto the loading section at zero speed in the direction of conveyance of the transfer conveyor, while the loading section is non-driven.

13. The method according to claim 12 wherein step C comprises rotating a reversing conveyor by 180° about a substantially vertical axis.

14. The method according to claim 12 wherein step D comprises conveying the items from a reversing conveyor of the reversing mechanism onto a transfer conveyor comprising a frame and a drivable conveying surface disposed on the frame, the frame being retractable to a position beneath the reversing conveyor and extendable from beneath the reversing conveyor to a position over the loading section, step E comprising extending the frame in the direction of conveyance with the conveying surface being non-driven and while conveying the items from the reversing conveyor to the conveying surface, and thereafter retracting the frame while driving the conveying surface to convey the items forwardly at the same speed that the frame is retracted, whereby the items have no net speed and eventually fall off the transfer conveyor and onto the loading section.

* * * * *